WILLIAM J. KENNEDY.
Improvement in Shaft-Hanging.
No. 127,488.            Patented June 4, 187_
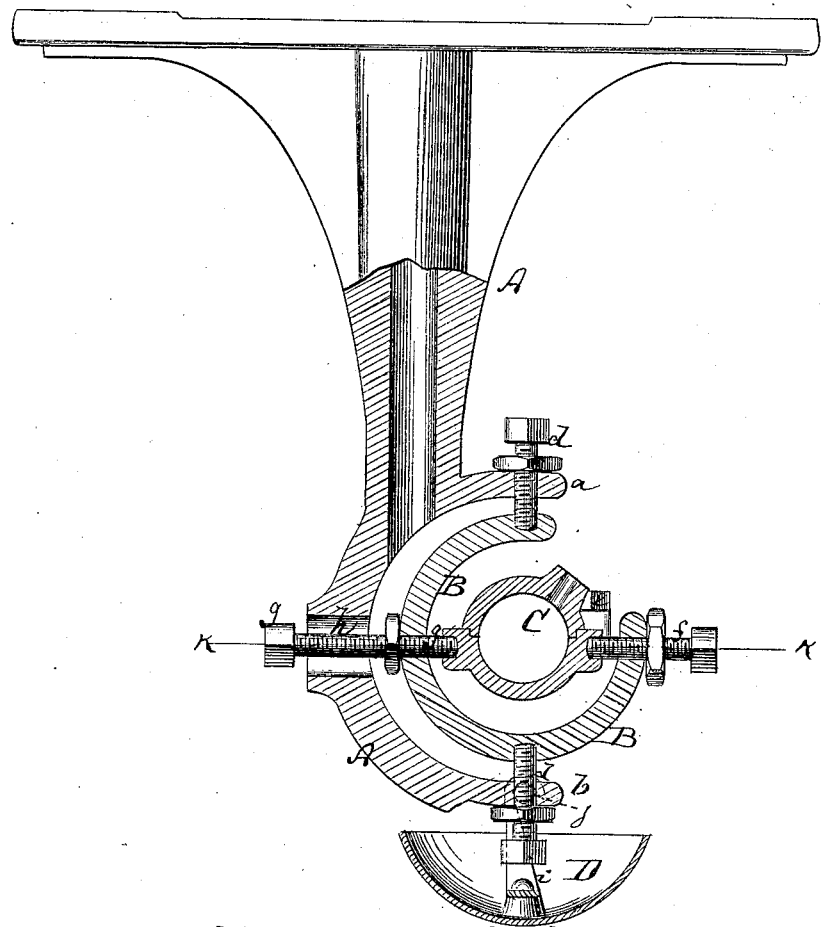
Fig. 1.
Fig. 2.
Witnesses:
John Becker
Geo. W. Mabee
Inventor:
W. J. Kennedy
per
Attorneys.
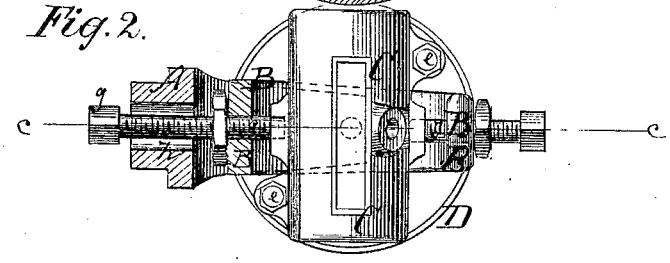

127,488

UNITED STATES PATENT OFFICE.

WILLIAM J. KENNEDY, OF VICTORY MILLS, NEW YORK.

IMPROVEMENT IN SHAFT-HANGINGS.

Specification forming part of Letters Patent No. 127,488, dated June 4, 1872.

Specification describing a new and Improved Shaft-Hanging, invented by WILLIAM J. KENNEDY, of Victory Mills, in the county of Saratoga and State of New York.

Figure 1 represents a sectional side view of my improved shaft-hanging, the line $c\ c$, Fig. 2, indicating the plane of section. Fig. 2 is a horizontal section of the same on the line $k\ k$, Fig. 1.

Similar letters of reference indicate corresponding parts.

This invention relates to a new self-adjusting shaft-hanging, of such construction that the shaft will be held secure and prevented from falling even if one of the supporting-pivots should break. The invention consists, principally, in extending one of the screws that serve as pivots for the bearing through a swivel-holder, and through a slot in the hanger, so that such screw will constitute an additional means of safety for the parts supported by the hanger, and also limit the horizontal vibration of the swivel-holder, the slot being of such diameter and form as to allow of the necessary vibratory movement of the screw therein.

A in the drawing represents the hanger, fastened to the under side of a beam or ceiling in suitable manner, and formed with two jaws, $a$ and $b$, at its lower part, so that its lower part will be C-shaped, as shown. Instead of being a pendent hanger it may be a post or side hanger, or even a floor-hanger, if desired. Through the jaws $a\ b$ are fitted two vertical screws, $d\ d$, whose inner ends serve as pivots for the curved holder B. This holder is almost entirely cylindrical, enough only being cut away to permit the convenient lubrication of the bearing C. This bearing is cylindrical and made in two halves, that are connected by screws $e\ e$. The bearing is supported within the holder B by means of two horizontal screws, $f$ and $g$. The screw $f$ is held in the outer side of the holder B. The screw $g$, being held in the opposite side of the holder, extends further through a slot, $h$, in the hanger A, as shown. On the screws $f\ g$ the bearing C can swing vertically; on the screws $d\ d$ it can swing horizontally. The horizontal motion is limited by the extent of the slot $h$, within which the screw $g$ plays. The bearing is thus self-adjusting in every direction. The several screws $d\ d, f$, and $g$ are provided with jam-nuts to be properly secured in place. If one of the screws $d\ d$ should break, the holder B will find an additional support by the screw $g$, which extends through the hanger; if the screw $f$ or $g$ breaks, the curve of the holder will still retain the bearing and prevent the shaft from falling. A very strong and substantial self-adjusting hanging is thus produced.

D represents a cup, suspended by means of hooks $i\ i$ from pins $j$, that project from the sides of the lower jaw $b$. It serves to catch the drippings of the lubricating material from the bearings.

Having thus described my invention, I claim as new and desire to secure by Letters Patent—

The combination of the hanger or post A, swivel-holder B, and bearing C with the screws $d\ d, f$, and $g$, when the screw $g$ extends through a slot in the hanger which is of such form and diameter as to permit a vibratory movement of the screw, and the holder is separated from the hanger, substantially as herein shown and described.

WM. J. KENNEDY.

Witnesses:
 HERVEY LOSEE,
 JOHN C. TIFFT.